United States Patent [19]

Watanabe et al.

[11] 4,312,718
[45] Jan. 26, 1982

[54] METHOD FOR PRODUCING FLUORINE

[75] Inventors: Nobuatsu Watanabe, 136, Uguisudai, Nagaokakyo-shi, Kyoto, Japan; Minoru Aramaki; Yasushi Kita, both of Ube, Japan

[73] Assignees: Nobuatsu Watanabe, Kyoto; Central Glass Co., Ltd., Ube; Toyo Tanso Co., Ltd., Osaka, all of Japan

[21] Appl. No.: 161,593

[22] Filed: Jun. 20, 1980

[30] Foreign Application Priority Data

Aug. 2, 1979 [JP] Japan .................................. 54-98068

[51] Int. Cl.³ .............................................. C25B 1/24
[52] U.S. Cl. ...................................... 204/60; 204/294
[58] Field of Search ...................... 204/60, 294, 243 R; 264/29.5

[56] References Cited

U.S. PATENT DOCUMENTS 3,442,787 5/1969 Landrum et al. ................ 204/243 R
4,226,900 10/1980 Carlson et al. ...................... 264/29.5

FOREIGN PATENT DOCUMENTS 655098 7/1951 United Kingdom ................... 204/60

OTHER PUBLICATIONS

Pinkston, "Preparation of Fluorine", Ind. & Engineering Chem., vol. 39, No. 3 (Mar. 1947) pp. 255-258.

Primary Examiner—Howard S. Williams
Attorney, Agent, or Firm—Armstrong, Nikaido, Marmelstein & Kubovcik

[57] ABSTRACT

The use of an isotropic carbon block having an anisotropy of not more than 1.2 in terms of an anisotropic ratio of specific resistance as an anode in the production of fluorine by the electrolysis of an electrolyte comprising a mixed molten salt system of potassium fluoride and hydrogen fluoride has been found to be extremely useful for attaining increase in critical current density so that occurrence of the unfavorable anode effect can be effectively prevented. With such an isotropic carbon block anode, even if the anode effect occurs, the electrolysis can be stably continued again by lowering the potential of the electrode. Further, the incorporation of a fluoride into the isotropic carbon block anode and/or the addition of a fluoride into the electrolyte is effective for further increasing critical current density.

9 Claims, 4 Drawing Figures

METHOD FOR PRODUCING FLUORINE

This invention relates to a method for producing fluorine using a molten salt electrolytic cell having as an anode a carbon electrode. More particularly, the present invention is concerned with a method for producing fluorine by the electrolysis of an electrolyte comprising a mixed molten salt system of potassium fluoride and hydrogen fluoride, said electrolysis being conducted in an electrolytic cell using as an anode a carbon block having a reduced rate of anisotropy.

In the electrolysis of a molten salt electrolyte comprising a fluoride by the use of a carbon electrode as an anode, there is generally observed occurrence of the so-called anode effect which is represented by an abrupt spontaneous rise of voltage and decrease of current due to the anodic polarization. In practicing the conventional method of electrolyzing a molten salt electrolyte comprising a fluoride, there are various difficulties caused by such anode effect. Illustratively stated, the anode effect leads to practical disadvantages such as waste of electric power, non-uniformity of thermal equilibrium, lowering of efficiency, need of complicated arrangement of workers for operational administration, etc. Especially in the case of the production of fluorine by the electrolysis of an electrolyte comprising a mixed molten salt system comprising potassium flouride and hydrogen fluoride, the phenomenon of the anode effect tends to often occur even under conditions of relatively low current densities. Therefore, in the conventional method for producing fluorine by the electrolysis, in order to avoid occurrence of the phenomenon of the anode effect, the operation of electrolysis is necessarily conducted at still lower current densities, leading to disadvantages from an industrial point of view.

It is believed that the phenomenon of the anode effect is attributed to decrease in wettability of the carbon anode for the electrolyte due to the formation of a film of graphite fluoride on the anode during the course of the electrolysis reaction. As a criterion of occurrence of the anode effect, there can be mentioned a critical current density (hereinafter referred to as "CCD") at which the anode effect occurs. The value of CCD varies depending on various factors, such as the hydrogen fluoride (HF) concentration of a molten salt electrolyte bath, the temperature of the electrolyte bath, the presence of insoluble substances in the electrolyte bath, the kind of material, shape and arrangement of the anode, and the like. The present inventors have noted that, of the above-mentioned factors, the kind of material of the anode has a great influence on CCD, and made investigations on the kind of material of anode which can attain suppression of occurrence of the anode effect, that is, can attain increase of CCD.

Conventionally, a carbon anode to be employed in an electrolytic cell for the electrolytic production of fluorine, in general, is produced by a process in which a mixture of a pulverized coke such as petroleum coke or pitch coke as a main raw material and a binder such as coal-tar pitch is molded by extrusion molding or vibration molding and then subjected to heat treatment at about 800° to about 1,200° C. In the above-mentioned method, since the carbon particles of pulverized coke have a needle-like shape and, in addition, they are caused to be arranged in a specific direction with respect to the pressure applied at the time of molding, there is obtained an anisotropic carbon block molding in which the microcrystals of graphite constituting the carbon material are oriented in a specific direction. Therefore, the carbon anode produced by heating such a carbon block molding at about 800° to about 1,200° C. is of anisotropy. The rate of anisotropy of the conventional carbon anode thus produced may somewhat vary depending on the kind of raw carbon material and conditions of the steps involved in the process, but generally is 1.3 or more in terms of an anisotropic ratio of specific resistance. When the carbon anode made of the anisotropic carbon block which has been heated at about 800° to about 1,200° C. after molding and having an anisotropic ratio of specific resistance of, for example, 1.4 is measured, with respect to CCD, in a molten salt electrolyte of a KF-2HF system by a potential sweep method, the result shows that the CCD value of the above carbon anode is as low as about 12 A/dm$^2$. The actual electrolytic production of fluorine is usually conducted at a current density of about 10 A/dm$^2$. In view of the above, it will be easily understood that according to the conventional method the electrolytic production of fluorine, in fact, is unavoidably conducted with an extremely low efficiency.

With a view to attaining increase of CCD in the electrolytic production of fluorine whereby occurrence of unfavorable phenomenon of anode effect is effectively prevented during the course of the electrolysis of a molten salt electrolyte of a KF-HF system, the present inventors have made extensive and intensive studies on carbon materials usable as an effective anode. As a result, it has unexpectedly been found that when a carbon block of a so-called isotropic carbon having a reduced rate of anisotropy is employed as an anode in the electrolytic production of flourine the CCD value can be extremely increased. The present invention has been made based on such a novel finding.

Accordingly, it is one and a principal object of the present invention to provide a method for producing fluorine by the electrolysis of a molten salt electrolyte of a KF-HF system, in which occurrence of the anode effect is effectively prevented so that the electrolytic production of fluorine at high current densities can be conducted.

It is another object of the present invention to provide a method for producing fluorine as described above, which enables the electrolytic production to be conducted extremely stably.

The foregoing and other objects, features and advantages of the present invention will be apparent to those skilled in the art from the following detailed description and the accompanying drawings in which.

and

Figure 4:
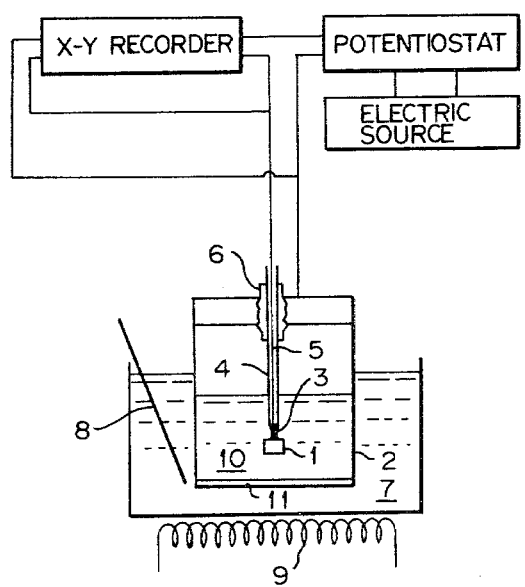

FIG. 4 is a diagrammatic view of the apparatus used for measuring critical current densities.

Essentially, according to the present invention, there is provided a method for producing fluorine comprising electrolyzing an electrolyte comprising a mixed molten salt system of potassium fluoride and hydrogen fluoride in an electrolytic cell having as an anode a carbon block, characterized in that the electrolysis of the electrolyte is conducted using as the anode a carbon block having an anisotropy of not more than 1.2 in terms of an anisotropic ratio of specific resistance.

The term "anisotropic ratio of specific resistance" used herein is intended to indicate a meaning as follows. From one carbon block are prepared five test pieces each having a shape of rectangular parallelepiped (10 mm × 10 mm × 60 mm) by cutting randomly in different directions. With respect to each of the five test pieces, specific resistances are measured in X-, Y- and Z-directions of a system of X-Y-Z coordinates involved in each test piece. Measurement of a specific resistance is done in accordance with the method prescribed in Japanese Industrial Standards (JIS) R7202-1979, 6.2 (Voltage Dropping Method). As a result, with respect to each of X-, Y- and Z-directions there are obtained five data, and an average value is then calculated therefrom. From three average values respectively obtained in X-, Y- and Z-directions, the ratio of the maximum value to the minimum value is calculated and defined as an anisotropic ratio of specific resistance of the carbon block.

Carbon blocks having an anisotropy of not more than 1.2 in terms of an anisotropic ratio of specific resistance are those generally called isotropic carbon products. In practicing the method of the present invention, it is more preferable to employ as an anode a more isotropic carbon block having an anisotropy of not more than 1.15 in terms of an anisotropic ratio of specific resistance.

With respect to a process for the production of the above-mentioned isotropic carbon products, reference may be made to, for example, Article titled "Tohosei Ogata Tanso no Tokusei to Oyo (Properties and Applications of Isotropic large-sized Carbon)" written by Kanji Matsuo in "Kagaku Kojo Shi (Journal of Chemical Factories)", Vol. 19, No. 10, pages 81 to 86 (1975). In this Article, descriptions include the step of final heat treatment for graphitization of the product. Therefore, in order to obtain an isotropic carbon product to be used in the method of the present invention, the process disclosed in the above-mentioned Article may be employed with omission of the step of final heat treatment for graphitization. According to the illustrative disclosure of Kanji Matsuo, an isotropic carbon product to be employed in the method of the present invention may be obtained by (1) a process in which a raw carbon material having an isotropic structure and/or shape is used (see, for example, a process for the production of a raw carbon material as disclosed in Japanese Patent Application Publication No. 39427/1975) or (2) a process in which the particles of coke as a raw material are molded into a block by such a molding method as will not cause the particles to be arranged in a specific direction (see, for example, a process of isotropic press molding as disclosed in Japanese Patent Application Publication No. 20197/1976) and the subjected to heat treatment at about 800° to about 1,200° C.).

The average particle size of carbon particles constituting an isotropic carbon block to be employed as the anode in the electrolysis of the method according to the present invention may be preferably not more than about 50μ, more preferably not more than about 30μ, most preferably 5 to 20μ.

In the production of fluorine by the electrolysis of a mixed molten salt electrolyte of a KF-HF system in an electrolytic cell having a carbon anode, the lower the rate of anisotropy of a carbon block used as the carbon anode, the greater the CCD value. However, in case the carbon block used as the carbon anode has an anisotropy of more than 1.2 in terms of an anisotropic ratio of specific resistance, the increase in CCD, namely, the suppression of the anode effect is insufficient. When the carbon block used as the carbon anode has an anisotropy of 1.2 or less in terms of an anisotropic ratio of specific resistance, there is observed a remarkable increase in CCD so that occurrence of the anode effect can be effectively prevented, leading to great advantages from an industrial point of view. For example, when a carbon block having an anisotropy of 1.10 in terms of an anisotropic ratio of specific resistance is used as the carbon anode in the production of fluorine by the electrolysis of a mixed molten salt electrolyte of a KF-HF system [KF/HF (molar ratio): 1/2, hereinafter often referred to as "KF-2HF system"], the measurement by the potential sweep method shows that the CCD value is increased to 36 A/dm$^2$.

In another aspect of the present invention, the CCD value in the electrolytic production of fluorine from a mixed molten salt electrolyte of a KF-HF system can be further increased by the use of an isotropic carbon block having an anisotropy of not more than 1.2 and having a fluoride incorporated therein. Generally, in the production of an isotropic carbon block, a molding operation is conducted prior to the heat treatment at about 800° to about 1,200° C. The incorporation of a fluoride may be effected by admixing a raw carbon material with a fluoride and then subjecting the resulting mixture to molding, followed by heat treatment. In this connection, however, it is noted that the manner or time of incorporating a fluoride into an isotropic carbon block is not limited to that above-mentioned. As examples of the fluoride suitable for the purpose, there can be mentioned LiF, AlF$_3$, CaF$_2$, NiF$_2$, NH$_4$F and fluorides of Na, Co, Sb, Ir, In, Cr, Zr, Zn. They may be used either alone or in combination. When the amount of a fluoride incorporated into the isotropic carbon block is too small, the effect of the incorporation of the fluoride is not exerted. On the other hand, when the amount of a fluoride is too large, not only any proportional effect to such a large amount of fluoride is not attained, but also the effective area of the carbon block as the carbon anode is rather decreased by the incorporation of the excess amount of fluoride, leading to an unfavorable influence on the function of the carbon block as the anode. For this reason, the amount of a fluoride to be incorporated into an isotropic carbon block may preferably be 0.1 to 5% by weight based on the isotropic carbon block anode. For example, when an isotropic carbon block having an anisotropy of 1.10 and having 1% by weight, based on the isotropic carbon block anode, of LiF incorporated therein is used as the anode in the electrolytic production of fluorine from a mixed molten salt electrolyte of a KF-2HF system, the measurement by the potential sweep method shows that the CCD value is increased to 46 A/dm$^2$.

The above-mentioned incorporation of a fluoride into an isotropic carbon block has a significant meaning from a practical point of view. Illustratively stated, the anisotropic carbon block having a fluoride incorporated thereinto is extremely poor in strength or resistance when it is used as the anode in a mixed molten salt electrolyte of a KF-HF system for the electrolytic production of fluorine, and therefore cannot be practically used. In general, the essential requirement for an electrode to be used in a molten salt electrolyte bath is a strength resistible to the molten salt electrolyte bath. Especially in the case of a non-consumptive type electrode such as an electrode to be used in a mixed molten salt electrolyte of a KF-HF system for the electrolytic production of fluorine, the strength or resistance of the electrode in the molten electrolyte bath is extremely important. As described, according to said another aspect of the present invention, an isotropic carbon block having an anisotropy of not more than 1.2 in terms of an anisotropic ratio of specific resistance has a fluoride incorporated therein to provide an isotropic carbon block anode having improved electrochemical characteristics. In this connection, it should be noted that the thus obtained isotropic carbon block anode having a fluoride incorporated therein is extremely excellent in strength or resistance in a mixed molten salt electrolyte bath as compared with the conventionally employed anisotropic carbon block anode. In other words, according to the present invention, the incorporation of a fluoride into a carbon anode, for the first time, becomes possible without any sacrifice of the strength of a carbon anode.

According to a further aspect of the present invention, the CCD value is further increased in the electrolytic production of fluorine by the electrolysis of a mixed molten salt electrolyte of a KF-HF system in an electrolytic cell having as a carbon anode an isotropic carbon block having an anisotropy of not more than 1.2 in terms of an anisotropic ratio of specific resistance or an isotropic carbon block having an anisotropy of not more than 1.2 and having a fluoride incorporated therein, by incorporating a fluoride other than KF and HF into said mixed molten salt electrolyte of a KF-HF system. As examples of the fluoride suitable for the purpose, there can be mentioned LiF, $AlF_3$, $CaF_2$ and $NiF_2$. They may be incorporated either alone or in combination. When the amount of a fluoride incorporated into the electrolyte exceeds an amount corresponding to the solubility of the fluoride for the electrolyte plus 5.0% by weight based on the electrolyte bath, the fluoride unfavorably tends to be accumulated in the form of a sludge in the bottom of the electrolytic cell. The suitable amount of a fluoride to be incorporated into the electrolyte bath is in the range of from 0.1% by weight based on the electrolyte bath to an amount corresponding to the solubility of the fluoride for the electrolyte plus 5.0% by weight based on the electrolyte bath, preferably about 0.3 to about 3% by weight based on the electrolyte bath.

Potassium fluoride and hydrogen fluoride which are main components of a mixed molten salt electrolyte of a KF-HF system may be used at various molar ratios in the range of not less than 1. The preferred molar ratio of HF to KF is 1.8 to 2.2.

With respect to a cathode material, there may be employed materials generally used for the electrolytic production of fluorine. Representative examples of them include iron, steel, nickel and Monel metal.

Figure 1:
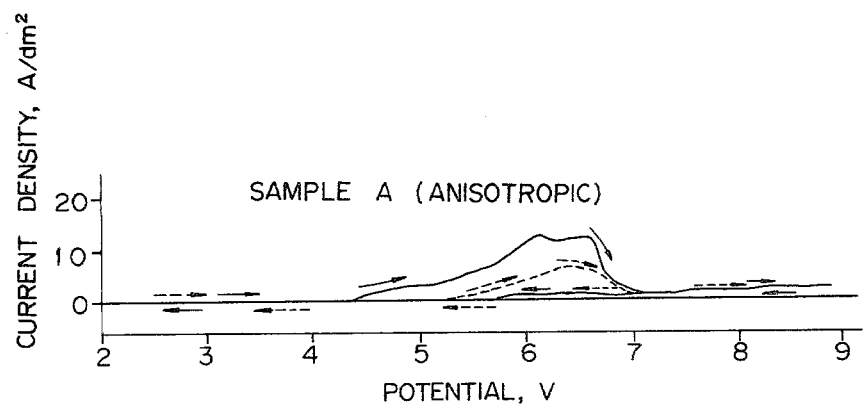
FIG. 1 shows current density-potential curves obtained by the potential sweep method with respect to an anisotropic carbon block (anisotropic ratio of specific resistance: 1.4) used as an anode in a molten salt electrolyte of a KF-HF system.
Figure 2:
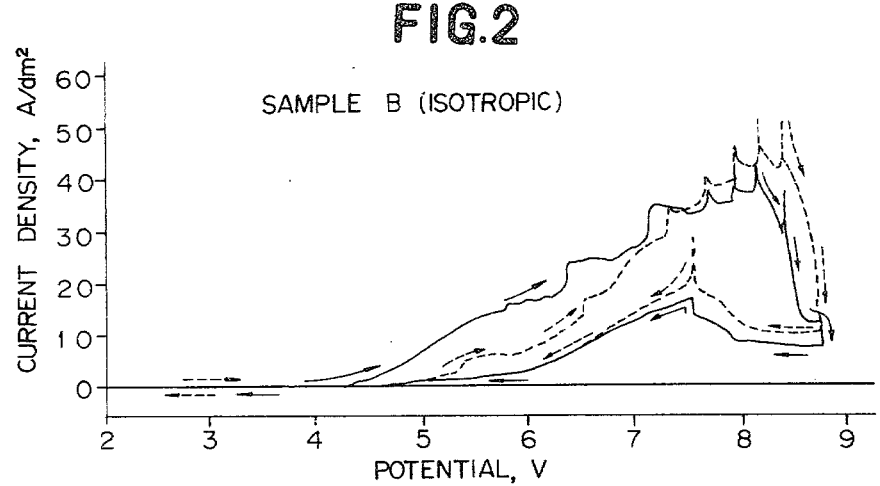
FIG. 2 shows current density-potential curves obtained by the potential sweep method with respect to an isotropic carbon block (anisotropic ratio of specific resistance: 1.10) used as an anode in a molten salt electrolyte of a KF-HF system.
Figure 3:
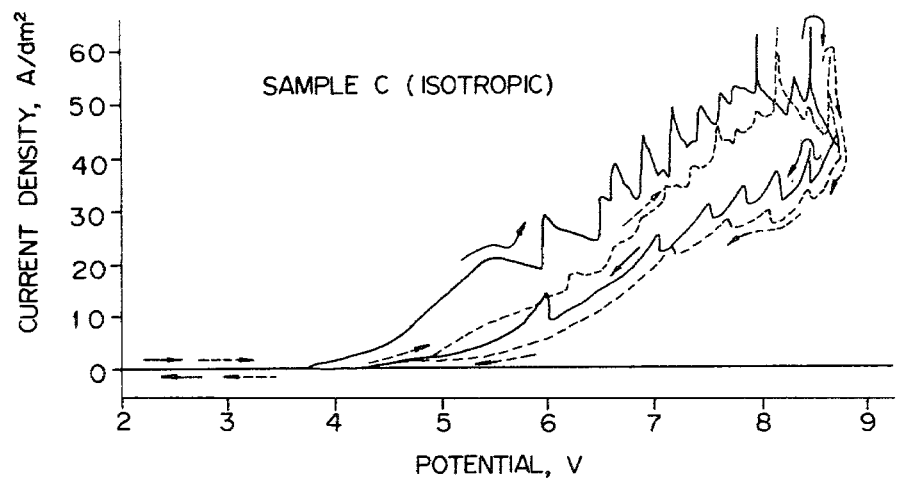
FIG. 3 shows current density-potential curves obtained by the potential sweep method with respect to an isotropic carbon block (anisotropic ratio of specific resistance: 1.10) having 1% by weight of LiF incorporated therein which is used as an anode in a molten salt electrolyte of a KF-HF system.

When the production of fluorine by the electrolysis of a mixed molten salt electrolyte of a KF-HF system is conducted using as an anode an anisotropic carbon block conventionally used, the electrolysis cannot be continued any more if the anode effect occurs even once. In contrast, when an isotropic carbon block having an anisotropy of not more than 1.2 in terms of an anisotropic ratio of specific resistance is used as an anode for the electrolytic production of fluorine from a mixed molten salt electrolyte of a KF-HF system and the electrolysis conducted, even if the anode effect occurs, the electrolysis can surprisingly be continued again by lowering the voltage of the electrolyte bath. For illustrating the surprising effect of the method of the present invention, anode current density-potential curves were obtained by the potential sweep method under such conditions that a mixed molten salt electrolyte of a KF-2HF system was used as an electrolyte bath, iron was used as a cathode and the electrolysis temperature was 100° C., with respect to a conventional anisotropic carbon block having an anisotropy of 1.4 (Sample A), an isotropic carbon block having an anisotropy of 1.10 (Sample B) and an isotropic carbon block having an anisotropy of 1.10 and having 1% by weight, based on the carbon block anode, of LiF incorporated therein (Sample C), which were used as an anode. The results are shown in FIGS. 1, 2 and 3. In the potential sweep method, the first sweep was conducted by elevating the potential of the electrode from 2 V to 8.7 V at a sweep rate of 0.1 V/sec and subsequently lowering the potential of the electrode from 8.7 V to 2 V at a sweep rate of 0.1 V/sec to obtain a current density-potential curve of the first sweep. In FIGS. 1 through 3, the current density-potential curves of the first sweep are shown by a solid line. Next, the second sweep was conducted by elevating the potential of the electrode again from 2 V to 8.7 V at a sweep rate of 0.1 V/sec and subsequently lowering the potential of the electrode from 8.7 V to 2 V at a sweep rate of 0.1 V/sec. In FIGS. 1 through 3, the current density-potential curves of the second sweep are shown by a broken line. In FIG. 1 in which Sample A is employed as an anode, the current density-potential curves showing the returns of from 8.7 V to 2 V in both the first and the second sweeps pass substantially the same route. As is apparent from FIGS. 1 through 3, the current density of Sample A is extremely lowered in the second sweep as compared with those of Samples B and C. By contrast, in both the cases of Sample B and Sample C, substantially the same current density as that in the first sweep can be obtained in the second sweep and the subsequent sweep cycles. This fact clearly shows that even if the anode effect occurs the electrolysis can be stably continued again by lowering the potential of the electrode. Further, it should be noted that, with respect to Sample B and Sample C, the potential at a certain current density is about 1 V lower than that at the same current density of Sample A. For example, as is seen from FIGS. 1 through 3, the potential values at a current density of 10 $A/dm^2$ are 6.0 V for Sample A, 5.1 V for Sample B and 4.8 V for Sample C. This effect is particularly advantageous from a viewpoint of saving of energy.

As described, according to the present invention, when an isotropic carbon block having an anisotropy of not more than 1.2 in terms of an anisotropic ratio of specific resistance is used as an anode for the electrolytic production of fluorine from a mixed molten salt electrolyte of a KF-HF system, not only the CCD value in the electrolysis is extremely increased so that occurrence of the anode effect can be effectively prevented, but also the electrolysis can be stably continued even when the current density is increased in the electrolysis.

The present invention will now be described in detail with reference to the following Examples that by no means limit the scope of the present invention.

In the following Examples and Comparative Examples, the CCD (critical current density) values were measured using an apparatus as shown in FIG. 4. In FIG. 4, numeral 1 designates a carbon block anode (10 mm×10 mm×10 mm) covered, on its five sides, with a Teflon tape, leaving only one side exposed, numeral 2 an iron-made electrolytic cell (80$\phi$×150 mm) which serves also as a cathode, numeral 3 a sealing tape made of Teflon, numeral 4 a transparent tube made of Kel-F (trade name of polytrifluorochloroethylene manufactured and sold by M. W. Kellog Co., U.S.A.), numeral 5 an electrode-holding rod made of iron, numeral 6 a joint made of Teflon, numeral 7 an oil bath, numeral 8 a thermometer, numeral 9 a heater, numeral 10 a mixed molten salt electrolyte of a KF-2HF system and numeral 11 a plate made of Teflon.

REFERENCE EXAMPLE 1

Isotropic carbon blocks having an anisotropy of 1.10 in terms of an anisotropic ratio of specific resistance were prepared as follows. Petroleum coke was pulverized to have an average particle size of 15$\mu$, and pitchtar was then added thereto in an amount of ½ the amount of the petroleum coke. The resulting blend was kneaded at 200° C. using a Z-mixer until the volatile matter content became 12%. After cooling, the resultant was subjected to a secondary pulverization to obtain particles. The particles passing a 800-mesh sieve were used as a raw material for molding. The raw material thus obtained was subjected to press molding by means of a cold isotropic press under 1,000 atm/cm$^2$, followed by heat treatment. The heat treatment was conducted in such a manner that the molded article was heated to 1,000° C. at a temperature elevation rate of 3° C./hour and maintained at that temperature for 24 hours. After cooling, there was obtained a carbon product, which was then cut to give the desired isotropic carbon blocks each having a predetermined shape.

REFERENCE EXAMPLE 2

Isotropic carbon blocks having an anisotropy of 1.10 and respectively having LiF, CaF$_2$ and AlF$_3$ incorporated therein were prepared as follows. In the procedures of Reference Example 1, given amounts of respective fluorides were added to the raw materials for molding and blended using a V-blender, prior to being subjected to press molding by means of a cold isotropic press. Other procedures were conducted in substantially the same manner as described in Reference Example 1.

REFERENCE EXAMPLE 3

Anisotropic carbon blocks respectively having anisotropies of 1.29 and 1.40 were prepared in substantially the same manner as described in Reference Example 1, except that petroleum cokes were pulverized to have average particle sizes of 25 $\mu$ and 30 $\mu$, respectively and that an anisotropic press (metal mold press) was employed in place of a cold isotropic press.

EXAMPLES 1 to 4 and COMPARATIVE EXAMPLES 1 to 8

Carbon blocks respectively having anisotropies of 1.10, 1.29 and 1.40 in terms of anisotropic ratio of specific resistance were prepared according to Reference Examples 1 and 3. The thus obtained carbon blocks each having a size of 10 mm×10 mm×10 mm were used as anodes.

The anisotropy value of 1.4 is substantially the same that of the carbon block conventionally used as the anode for the production of fluorine by the electrolysis of an electrolyte comprising a mixed molten salt system of KF and HF.

As an electrolyte, there was employed a mixed molten salt of KF-2HF system. The CCD values were measured at 100° C. by the potential sweep method. The results are shown in Table 1. In the case of the isotropic carbon block having an anisotropy of 1.10 the CCD values were extremely increased as compared with the cases of the anisotropic carbon blocks respectively having anisotropies of 1.29 and 1.40.

Besides, electrolytes having the same system as mentioned above and respectively having LiF, CaF$_2$ and AlF$_3$ incorporated therein each in an amount of 1% by weight based on the electrolyte bath were used, and the electrolyses were conducted using the above-mentioned three kinds of carbon blocks. The CCD values were measured in the same manner as described above. The results are also shown in Table 1. As is apparent from Table 1, in the case of an isotropic carbon block also, the effect of addition of a fluoride into an electrolytic bath was clearly observed.

TABLE 1

| | | Critical current density, A/dm$^2$ | | |
| | Anisotropy of carbon block anode | Fluoride added into electrolyte bath | | |
| Example No. | | — | LiF | CaF$_2$ | AlF$_3$ |
|---|---|---|---|---|---|
| Examples 1–4 | 1.10 | 36 | 38 | 37 | 38 |
| Comparative Examples 1–4 | 1.29 | 19 | 26 | 25 | 27 |
| Comparative Examples 5–8 | 1.40 | 12 | 21 | 20 | 19 |

EXAMPLES 5 to 9

Isotropic carbon blocks each having an anisotropy of 1.10 and respectively having LiF, CaF$_2$ and AlF$_3$ incorporated thereinto each at varied contents, namely 0, 1, 3, 5 and 7% by weight were prepared according to the processes of Reference Examples 1 and 2. The carbon blocks each having a size of 10 mm×10 mm×10 mm were used as anodes. The CCD values were measured at 100° C. by the potential sweep method in substantially the same manner as described in Example 1. The results are shown in Table 2. The effect of incorporation of a fluoride into the anode somewhat varies depending on the kind of fluoride, but, in general, the incorporation of a fluoride in an amount up to about 5% by weight based on the carbon block anode exhibits an excellent effect.

TABLE 2

| Example No. | Amount of fluoride incorporated into carbon block anode, wt % | Critical current density, A/dm$^2$ Kind of fluoride incorporated | | |
|---|---|---|---|---|
| | | LiF | CaF$_2$ | AlF$_3$ |
| 5 | 0 | 36 | 36 | 36 |
| 6 | 1 | 46 | 40 | 43 |
| 7 | 3 | 45 | 42 | 43 |
| 8 | 5 | 37 | 40 | 41 |
| 9 | 7 | 35 | 33 | 36 |

EXAMPLES 10 to 14

Isotropic carbon blocks each having an anisotropy of 1.10 and respectively containing different fluorides in varied amounts were employed as anodes. Further, electrolytes respectively with and without fluorides added thereto were used. In substantially the same manner as described in Example 1, the CCD values were measured at 100° C. by the potential sweep method. The results are shown in Table 3. The synergistic effect of incorporation of a fluoride into the carbon block anode and addition of fluoride into the electrolyte was affirmed.

TABLE 3

| Example No. | Amount of fluoride incorporated into carbon block anode, wt % | Critical current density, A/dm$^2$ Kind of fluoride added into electrolyte and amount thereof | | | | | | | | |
|---|---|---|---|---|---|---|---|---|---|---|
| | | LiF, wt % | | | CaF$_2$, wt % | | | AlF$_3$, wt % | | |
| | | 0 | 0.3 | 1.0 | 0 | 0.3 | 1.0 | 0 | 0.3 | 1.0 |
| 10 | 0 | 36 | 39 | 41 | 36 | 38 | 39 | 36 | 38 | 39 |
| 11 | 1 | 46 | 49 | 51 | 40 | 40 | 42 | 43 | 46 | 47 |
| 12 | 3 | 45 | 53 | 54 | 42 | 44 | 47 | 43 | 47 | 49 |
| 13 | 5 | 37 | 39 | 42 | 40 | 42 | 44 | 41 | 42 | 44 |
| 14 | 7 | 35 | 36 | 35 | 33 | 37 | 35 | 36 | 35 | 38 |

What is claimed is:

1. A method for producing fluorine comprising electrolyzing an electrolyte comprising a mixed molten salt system of potassium fluoride and hydrogen fluoride in an electrolytic cell having as an anode a carbon block, characterized in that the electrolysis of the electrolyte is conducted using as the anode a carbon block having an anisotropy of not more than 1.2 in terms of an anisotropoic ratio of specific resistance.

2. A method according to claim 1, wherein said carbon block has a fluoride incorporated therein.

3. A method according to claim 2, wherein said fluoride is at least one member selected from the group consisting of LiF, AlF$_3$ and CaF$_2$, NiF$_2$, and fluorides of Na, Co, Sb, Ir, In, Cr, Zn.

4. A method according to any one of claims 2 and 3, wherein said fluoride is incorporated in an amount of 0.1 to 5% by weight based on the carbon block anode.

5. A method according to claim 2, wherein the fluoride is NH$_4$F.

6. A method according to any one of claims 1 to 4, wherein said electrolyte further comprises a fluoride other than KF and HF.

7. A method according to claim 6, wherein said fluoride is at least one member selected from the group consisting of LiF, AlF$_3$, CaF$_2$ and NiF$_2$.

8. A method according to claim 6, wherein said fluoride is present in an amount ranging from 0.1% by weight based on the electrolyte to an amount corresponding to the solubility of the fluoride for the electrolyte plus 5.0% by weight based on the electrolyte.

9. A method according to claim 1, wherein said carbon block is composed of carbon particles having an average particle size of not more than 50μ.

* * * * *